United States Patent [19]

Parfree et al.

[11] 4,239,336
[45] Dec. 16, 1980

[54] OPTICAL COMMUNICATION CABLE

[75] Inventors: Colin S. Parfree, Harlow; Peter Worthington, Southampton, both of England

[73] Assignee: International Standard Electric Corporation, New York, N.Y.

[21] Appl. No.: 965,678

[22] Filed: Dec. 1, 1978

[30] Foreign Application Priority Data

Dec. 5, 1977 [GB] United Kingdom ............... 50610/77
Dec. 13, 1977 [GB] United Kingdom ............... 51773/77

[51] Int. Cl.³ ................................................ G02B 5/16
[52] U.S. Cl. .................. 350/96.23; 174/70 R
[58] Field of Search ..................... 350/96.23; 174/70 R

[56] References Cited

U.S. PATENT DOCUMENTS

| 4,156,104 | 5/1979 | Mondello | 350/96.23 X |
| 4,160,872 | 6/1979 | Lundberg et al. | 350/96.23 X |

FOREIGN PATENT DOCUMENTS

| 2507649 | 9/1976 | Fed. Rep. of Germany | 350/96.23 |
| 2265108 | 10/1975 | France | 350/96.23 |
| 1172272 | 11/1969 | United Kingdom | 350/96.23 |
| 1438074 | 6/1976 | United Kingdom | 350/96.23 |

OTHER PUBLICATIONS

F. Aoki et al, "Development of Optical Fiber Communication Systems . . . " Hiatachi Review, vol. 26, No. 5, May 1977, pp. 181–187.

Primary Examiner—Stewart J. Levy
Attorney, Agent, or Firm—John T. O'Halloran; Peter C. Van Der Sluys

[57] ABSTRACT

An optical fiber cable, particularly for submarine cable use, has its fibers enclosed within a tubular electrical conductor which is itself overlayed by a dielectric layer. This layer is itself overlayed by a strength member formed of closely adjacent wires.

7 Claims, 9 Drawing Figures

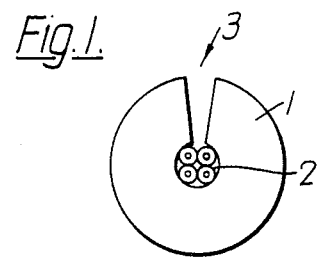
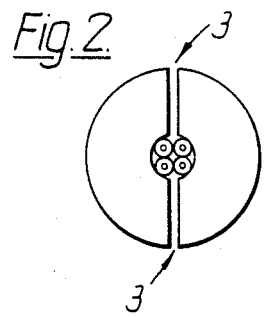
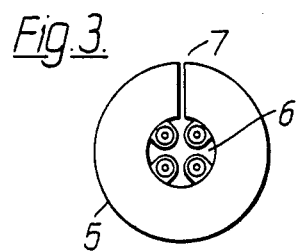
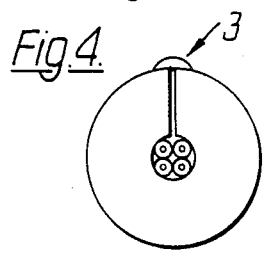
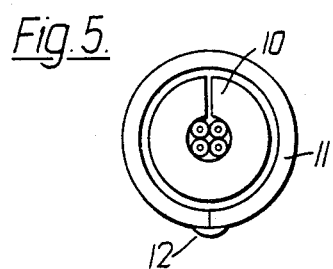
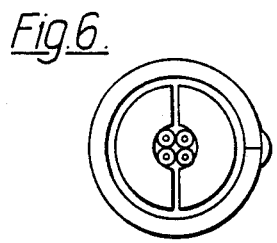
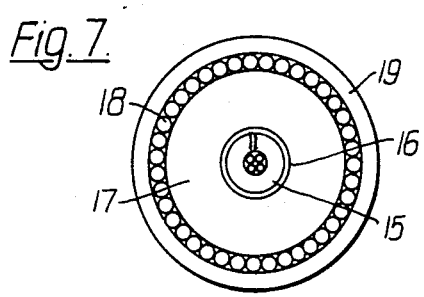

OPTICAL COMMUNICATION CABLE

BACKGROUND OF THE INVENTION

The present invention relates to optical fiber cables, and especially to such cables for submarine use.

Where optical fiber cables are used for relatively long distances, repeaters have to be provided at intervals determined by the attenuation of the optical fibers. These repeaters are powered electrically with the power supplied from the terminal via metallic conductors. In designing a cable to meet these requirements, it is essential that the cable when intended for undersea use should have good flexibility and should be resistant to high pressures and to the action of the sea.

SUMMARY OF THE INVENTION

An object of the invention is to provide optical fiber cables in which the above requirements are met in an economical manner.

According to the present invention there is provided an optical fiber cable which includes a centrally located tubular conductor which is provided with an external sheath and within which there are located one or more optical fibers.

According to the present invention there is further provided an optical fiber cable which includes a central conductor which is hollow and cylindrical within which there are located a plurality of optical fibers each within its own sheath, said conductor hermetically sealing the optical fibers, a dielectric layer which is also cylindrical and which overlies said tubular conductor, a cylindrical strength member of stranded type which overlies said dielectric layer, and an outer sheath overlying said strength member.

According to the invention there is also provided an optical fiber cable which includes one or more optical fibers located within a tubular electrical conductor over which there is a cylindrical strain member.

According to the invention there is also provided an optical fiber cable which includes a plurality of optical fibers located within a tubular electrical conductor, a cylindrical strength member formed by one or more layers of steel wire overlaying the tubular conductor, and a dielectric layer enclosing the strength member.

BRIEF DESCRIPTION OF THE DRAWINGS

Embodiments of the invention will now be described with reference to the accompanying drawings, in which:

FIGS. 1 to 6 are cross-sections of various forms of tubular conductor and optical fiber configurations for a cable embodying the invention;

FIGS. 7 and 8 are cross-sections of preferred cables embodying the present invention.

DETAILED DESCRIPTION OF THE INVENTION

Figure 8:
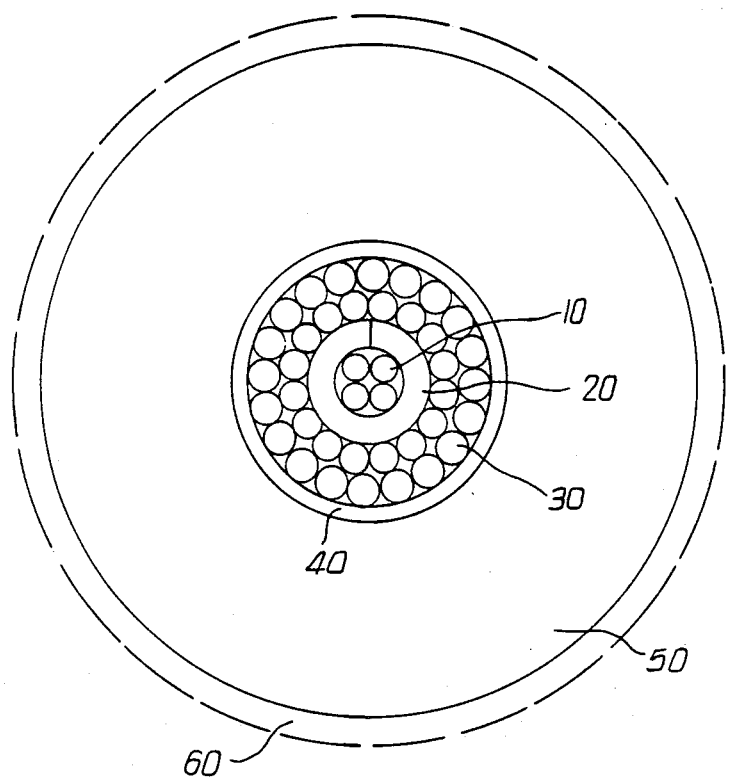

The cable constructions to be described herein all relate to cables in which four optical fibers have to be provided, although clearly the invention is not so limited. In fact, another construction contemplated provides for twelve optical fibers, all located within the tubular conductor.

In the arrangement of FIG. 1 we have an unsupported tube 1 of aluminum which is formed up continuously from sheet material, or is extruded from billet. The optical fibers, each with its cladding, are located inside the tube, as shown at 2. This construction may in some cases be difficult to produce in quantity because of the high ratio k of outside diameter to inside diameter needed to protect the fibers.

Hence it may be preferred to use the split tube arrangement of FIG. 2. In both FIGS. 1 and 2, the sealing in of the fibers can be effected by welded or soldered joint at 3. FIG. 4 shows a tube such as shown in FIG. 1 but sealed at 3 by a welded or soldered joint.

The k ratio referred to above may be reduced as in the arrangement of FIG. 3, where we have a tube 5 similar to that of FIG. 1 but thinner, within which there is a support member or kingwire of cruciform cross-section 6, so that it provides four "tunnels" each of which can accommodate one of the optical fibers. This also can be sealed by a welded or soldered joint at 7.

FIG. 5 shows the use of a tube 10 such as that of FIG. 1 within which the fibers are located and which is surrounded by an outer metal, e.g. copper, layer 11, welded or soldered at 12 to provide the seal. This is one of the preferred arrangements.

FIG. 6 is similar to FIG. 5, but using the split tube arrangement of FIG. 2.

Thus with the above arrangements it is possible to provide a signal member package which gives hermetic and hydrostatic protection for the fibers, and this can be done without the need for an internal supporting kingwire. However, as will be seen from FIG. 3, the invention is applicable where an internal kingwire is considered desirable for specialized applications.

We now turn to FIG. 7 which shows a preferred example of a cable which uses the arrangement of FIG. 5, above. This has a split aluminum tube 15 whose internal diameter is 3 mm and whose outside diameter is 5.4 mm, within which four optical fibers are located. Surrounding this is a copper tube 16 made from copper tape 0.3 mm thick and 18.9 mm wide which is formed over the aluminum tube so as to provide a hermetic seal.

Overlying the copper tube 16 there is a dielectric layer 17 formed by insulant polyethylene whose outside diameter is 12 mm. The strength member 18 consists of a layer of closely adjacent steel wires, with their bedding, and this layer is enclosed by a sheath or serving 19, with bitumen.

This cable has been found to have good handling characteristics, and its weight is not excessive as indicated by the fact that the weight of its core is 0.315 tons per nautical mile.

In another preferred embodiment shown in FIG. 8, a number of optical fibers, each with its own cladding, are shown at 10, these fibers being within a longitudinally split aluminum tube 20, which acts as a conductor for the supply of power to the repeaters. The split in this tube can be sealed, if desired, by soldering or welding as noted above.

The tube 20 is surrounded by a cylindrical strength member 30 formed by one or more layers of stranded high tensile steel wires, and this member is itself surrounded by a layer of a copper tape 40. Surrounding the tape layer 40 there is a dielectric layer 50, of polyethylene and this in turn is surrounded by a sheath 60 which for submarine cable use incorporates armouring. Since this has its fibers in a pressure-resisting tube, it provides excellent protection for the relatively fragile fibers.

In a specific example of the type illustrated in FIG. 8, there are four optical fibers within the split aluminum tube 20, whose internal diameter is 3 mm, the external diameter being 5.4 mm. The strength member consists of a first lay of 14 steel wires each 1.56 mm thick, while the second lay is a first layer of 14 steel wires each 1 mm thick plus a second layer of 14 steel wires each 1.15 mm thick. The copper tape is 33.8 mm wide and 0.25 mm thick, and the aluminum tube 20 and the tape 40 together form the conductor. Naturally if a non-metallic i.e. electrically insulating, strength member is used, the tube 20 and tape 40 could be used as separate conductors. The dielectric material used, the polyethylene, has an outside diameter of 25.02 mm.

Figure 9:
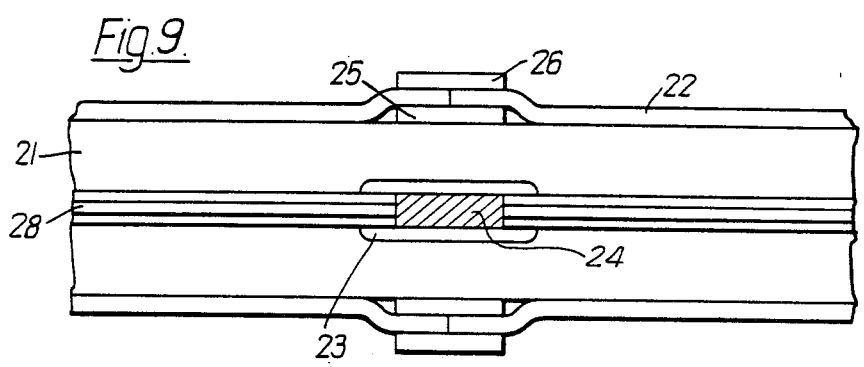
FIG. 9 shows schematically a joint for a cable embodying the present invention.

One of the advantages of having an external strength member is that jointing is facilitated as indicated by the cross-section of a cable joint shown in FIG. 9. Here we see the signal member 28, which includes the optical fibers and the tubular conductor, the dielectric layer 21 and the strength member 22. The signal members are jointed by an electrically conductive ferrule 23, within which there is, as indicated at 24, accommodation for fiber splices. The outer portion of the joint includes a first ferrule 25 into which the ends of the two dielectric layers, and an outer swaged or shrunk-fit ferrule 26. Thus, it will be seen that the use of an external strength member facilitates jointing. It will also be appreciated that it simplifies the problem of connecting the cable to a sealed repeater.

While we have described above the principles of our invention in connection with specific apparatus it is to be clearly understood that this description is made only by way of example and not as a limitation to the scope of our invention as set forth in the objects thereof and in the accompanying claims.

We claim:

1. An optical fiber cable, comprising:
    at least one optical fiber;
    a tubular electrical conductor disposed about said optical fiber and having a wall that is thick compared with the diameter of said optical fiber;
    an external sheath including a layer of dielectric material disposed about said tubular conductor; and
    a tubular strength member overlying said layer of dielectric material.

2. An optical fiber cable as described in claim 1, additionally comprising a layer of highly conductive material disposed about the outer surface of said tubular electrical conductor.

3. An optical fiber cable as described in claim 2, wherein the tubular electrical conductor is a longitudinally split tube of aluminum and the layer of highly conductive material comprises a layer of copper tape overlying said aluminum tube.

4. An optical fiber cable, comprising:
    a plurality of optical fibers, each having its own sheath;
    a hollow cylindrical electrical conductor disposed about said optical fibers, said conductor having a wall which is thick compared with the diameter of the plurality of optical fibers including their sheaths;
    a dielectric layer overlying said tubular conductor;
    a stranded cylindrical strength member overlying said dielectric layer; and
    an outer sheath overlying said strength member.

5. An optical fiber cable as described in claim 4, additionally comprising a layer of copper tape disposed over the surface of said electrical conductor.

6. An optical fiber cable, comprising:
    a plurality of optical fibers, each having its own cladding layer;
    a tubular electrical conductor formed by a longitudinally split aluminum tube disposed about said optical fibers;
    a cylindrical layer of copper tape disposed about the tubular electrical conductor for hermetically sealing said conductor;
    a layer of polyethylene overlying said tubular conductor;
    a cylindrical strength member formed by closely adjacent steel wires overlying said polyethylene layer; and
    a sheath overlying said strength member, the wall of said aluminum tube being thick compared with the total diameter of the optical fibers including the cladding.

7. An optical fiber cable, comprising:
    a plurality of optical fibers;
    a tubular electrical conductor formed by a longitudinally split tube of highly conductive metal disposed about said optical fibers;
    a cylindrical strength member formed by at least one layer of steel wire overlying said tubular conductor;
    a layer of tape of highly conductive material overlying the cylindrical strength member; and
    a dielectric layer enclosing said layer of tape.

* * * * *